J. Richards,
Steam-Engine Piston.
Nº 4,781.                    Patented Oct. 3, 1846.
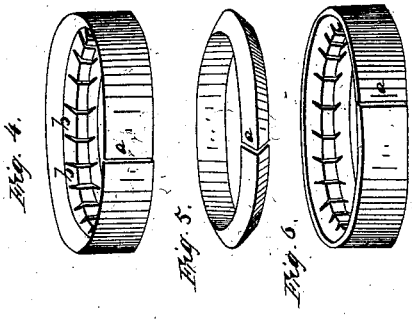
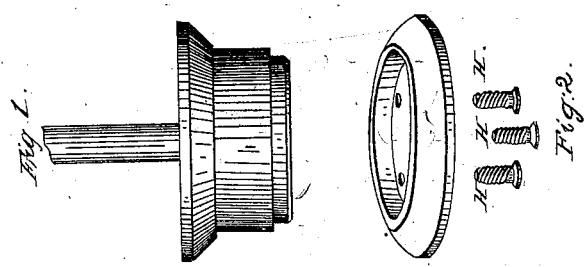
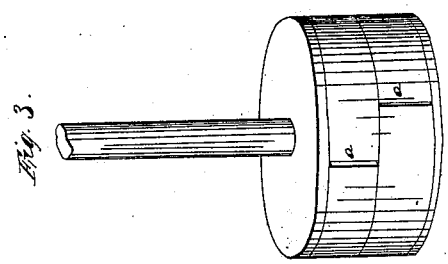

UNITED STATES PATENT OFFICE.

JAMES RICHARDS, OF NEW YORK, N. Y.

STEAM-PISTON.

Specification of Letters Patent No. 4,781, dated October 3, 1846.

*To all whom it may concern:*

Be it known that I, JAMES RICHARDS, of the city, county, and State of New York, have invented a new and useful invention or Improvement called the "Inclined Piston."

The nature of my invention consists in combining with the usual piston links and follower certain inclined spring rings acting on each other, on the principle of the wedge, in such manner that the periphery of the center rings is always in close contact with the inner surface of the cylinder in which the piston moves, being in itself self adjusting, and dispensing with the necessity of any packing whatever and applicable not only to steam engines but to pumps, and all other machines in which a piston is or can be used.

Of this invention the following is a full and exact description.

Figure 1, in the drawings herewith sent represents a piston bulk and Fig. 2 the follower when disconnected from the piston bulk and rod.

Although I claim nothing new in the piston bulk or follower, yet to adopt them to or use them with my improvement, the face of the follower from its point of contact with the shaft of the piston bulk must be inclined toward the circumference of the back of the follower as shown in Fig. 2, and in like manner the face of the bulge or head of the piston bulk must be inclined from the shaft of the piston bulk toward the circumference of the back of the piston head as shown in Fig. 1.

Fig. 3, represents a view of the piston when complete. Fig. 4, represents a view of one of the inclined rings which is to be placed on the piston bulk, its lower inward inclined surface resting on the inclined face of the piston follower. Fig. 5, represents a view of the double inclined self acting spring ring, which is to be placed on the piston bulk, its lower outward inclined surface resting on the upper inward inclined surface of the ring 4. Fig. 6, represents another inclined ring of the same size and shape as ring 4 which is also to be placed on the piston bulk, its lower inward inclined surface resting on the upper outward inclined surface of 5, and its upper inclined surface just reaching to and playing against the inclined surface of the piston bulk head. These three rings being thus placed, the piston bulk is to be inserted. The piston rod is then to be connected with the bulk and follower and firmly joined to them in the usual manner. In the drawings I have used screws H, H, H, for this purpose. In upright cylinders the rod generally passes through the follower first, then into or through the bulk, but on horizontal cylinders it passes through the bulk first and then into or through the follower, but which ever way it may be does not affect my invention.

The piston bulk, follower and rings may be made of any suitable material provided the material of the rings posesses the elasticity requisite to fulfill my invention. For steam engines the best material I consider to be cast iron. The inner surface of the ring Fig. 5 is to be made flat, its outer surface is composed of two inclines starting from its opposite edges and meeting equidistant from them. The inner circumference of this ring should be so much larger than the circumference of the shaft of the piston bulk as to allow a space about say, one half of an inch all around between the shaft and this ring. The outermost circumference of this ring should in like manner fall short all around about one eighth of an inch of the outer edge of the rings 4 and 6. The inner surfaces of the rings 4 and 6 should be at the distance of say about one eighth of an inch from the surface of the shaft of the piston bulk, while their outer circumferences before inserted in the cylinder should be a little larger than the inner circumference of the cylinder.

The manner of constructing a piston on my plan and adapting it to a cylinder is as follows: The head of the piston bulk and follower must be of such size as to fit in the cylinder and if there be any inequality in the bore of the cylinder of course the piston must be small enough to transverse any part of it in which it ought to move. I then cause three rings of the shape and relative proportion above given to be cast of iron and turned true on all their surfaces. From each of these rings I then cut out a segment (*a*) as represented in Figs. 4 and 6 of such size that such segment being removed there will be a space of about one eighth and one sixteenth of an inch more or less according to the size of the cylinder. The elasticity of cast iron will allow the two ends to be brought into close contact without breaking, and the ends so to be kept in contact for any length of time without materially impairing its elasticity. The inner diameter of the ring 5 being larger than those of the rings 4 and 6, and placed between them as above described it acts as a force to expand those rings and thus acting must in connection with the elasticity of 4 and 6 keep their outer surfaces in close contact with the inner surface of the cylinder. The rings 4 and 6 are to be made so large that the opening in them being for instance one eighth and one sixteenth of an inch before their insertion in the cylinder it will when they are inserted be but one eighth of an inch. Their tendency therefore is to press equally all around against the cylinder.

I do not intend to confine myself to any number of rings, but I think three the best number. Of course the surface of the outer rings must together extend from the flat part of the circumference of the back of the piston bulk head to the flat part of the circumference of the back of the follower and in placing the rings on the piston bulk the spaces in the rings should not be in a line, but the space in each ring opposite a solid part of the next ring and the inclined face of the follower and of the head of the piston bulk must be in close contact with the inclined surface of the rings next to them. By these means it will be almost impossible for any fluid or even steam to pass through and beyond the piston as they will in any of the pistons to my knowledge now in use.

What I claim as new in my invention and desire to secure by Letters Patent is—

The use and application to pistons of the three or more inclined elastic rings breaking joints and fitted to each other as described of cast iron or any suitable material working on the principle I have above mentioned and combined together and with a piston bulk head and follower or any substitutes for them and working together in manner substantially as above set forth and made known.

The advantages of my improvement I consider to be among other things: 1. That all packing and the trouble consequent thereon is dispensed with. 2. That the piston as an instrument will be as durable as the materials of which it is composed. 3. That it will be impermeable to steam or any liquid and consequently that a much less head of steam will give it the same power as a larger head of steam would in the ordinary pistons and that the force of the steam will be unbroken until the piston reaches its destination. 4. That it has less friction than other pistons and on this account also will require less steam. 5. That the piston will adapt itself to any inequalities in the bore of the cylinder by its own operation yielding in a narrow part and expanding in a broader. 6. In the common ring pistons there is always a practical difficulty in fixing the rings so that their circumference shall be exactly parallel with the circumference of the piston bulk or rod and the inner surface of the cylinder as it is necessary they should be to their proper working, but my rings being independent of the piston bulk and always parallel to the cylinder by their self adjustment this difficulty is avoided. I suppose most engineers or machinists would reject a cylinder having any marked difference of bore and have therefore calculated the above for adaptation to such slight inequalities as are almost unavoidable or to cylinders with perfectly true bores.

In testimony whereof I the said JAMES RICHARDS hereto subscribe my name in presence of the witnesses whose names are hereto subscribed on the fourth day of May one thousand eight hundred and forty six.

JAMES RICHARDS.

Signed in our presence:
A. HALSEY,
JUSTIN STRONG.